Jan. 16, 1934.  A. FORTINI  1,944,144
VEHICLE BRAKING SYSTEM
Original Filed Nov. 8, 1923  5 Sheets-Sheet 1
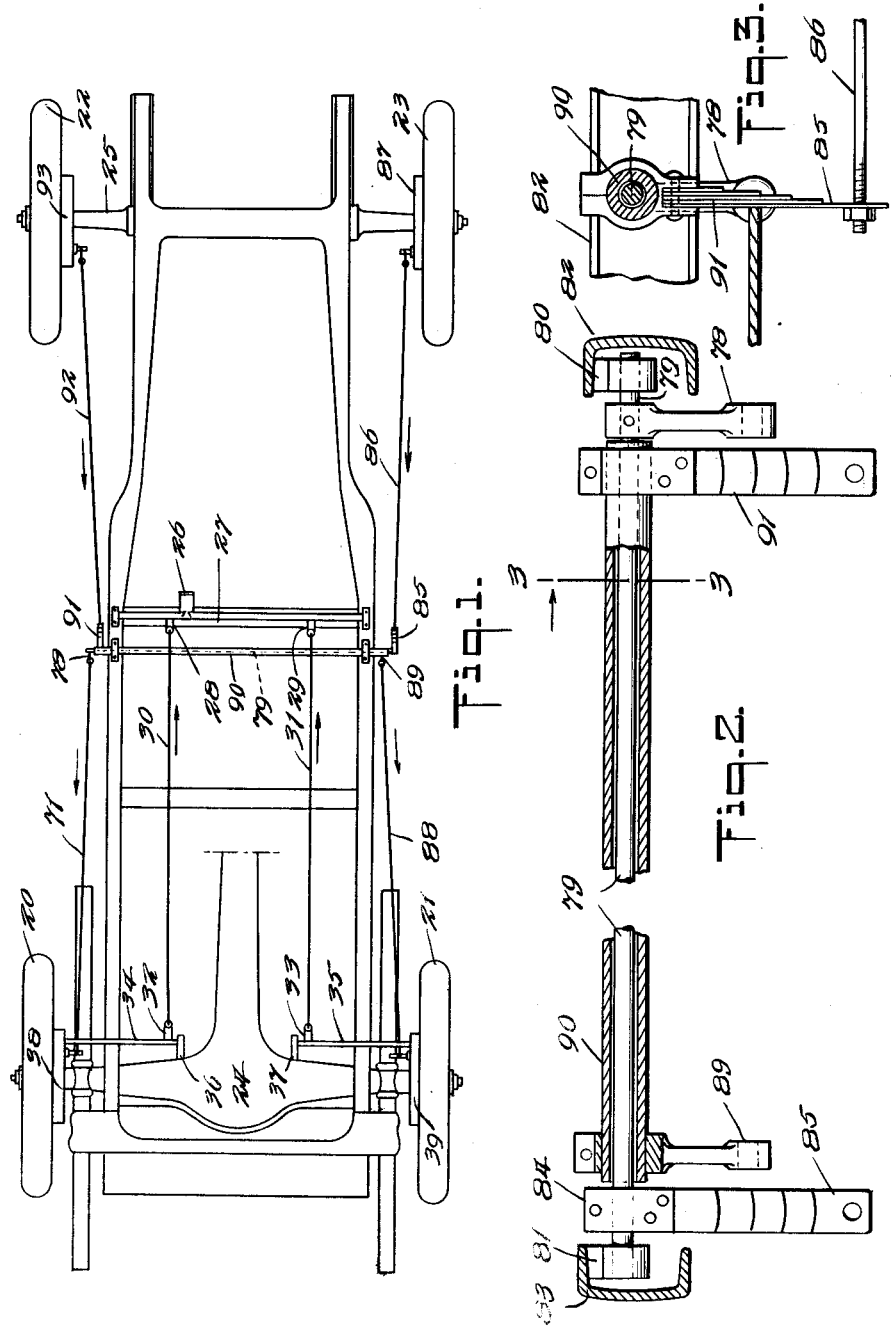
INVENTOR
*Arturo Fortini*
BY
ATTORNEYS

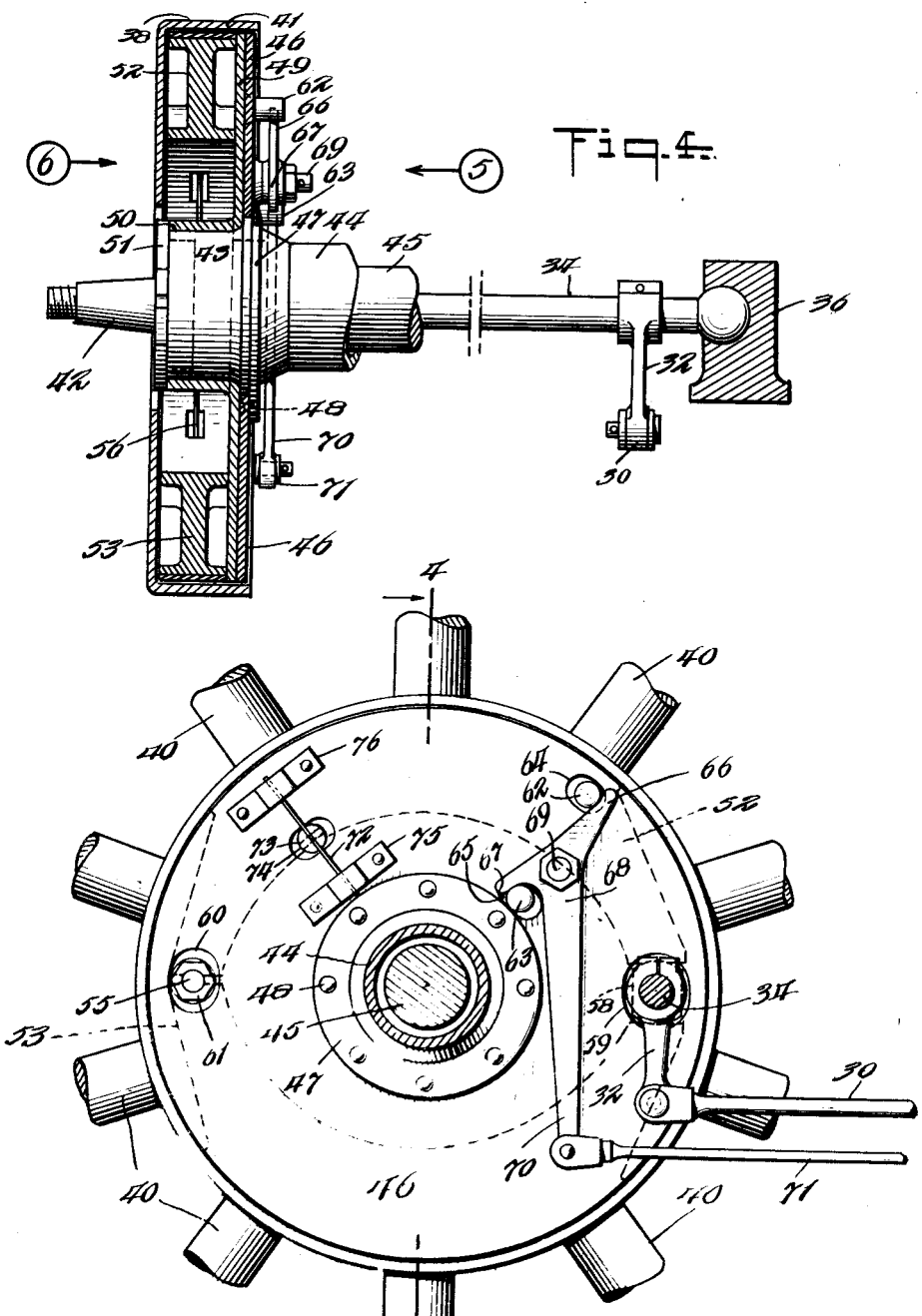

Jan. 16, 1934.  A. FORTINI  1,944,144
VEHICLE BRAKING SYSTEM
Original Filed Nov. 8, 1923  5 Sheets-Sheet 4
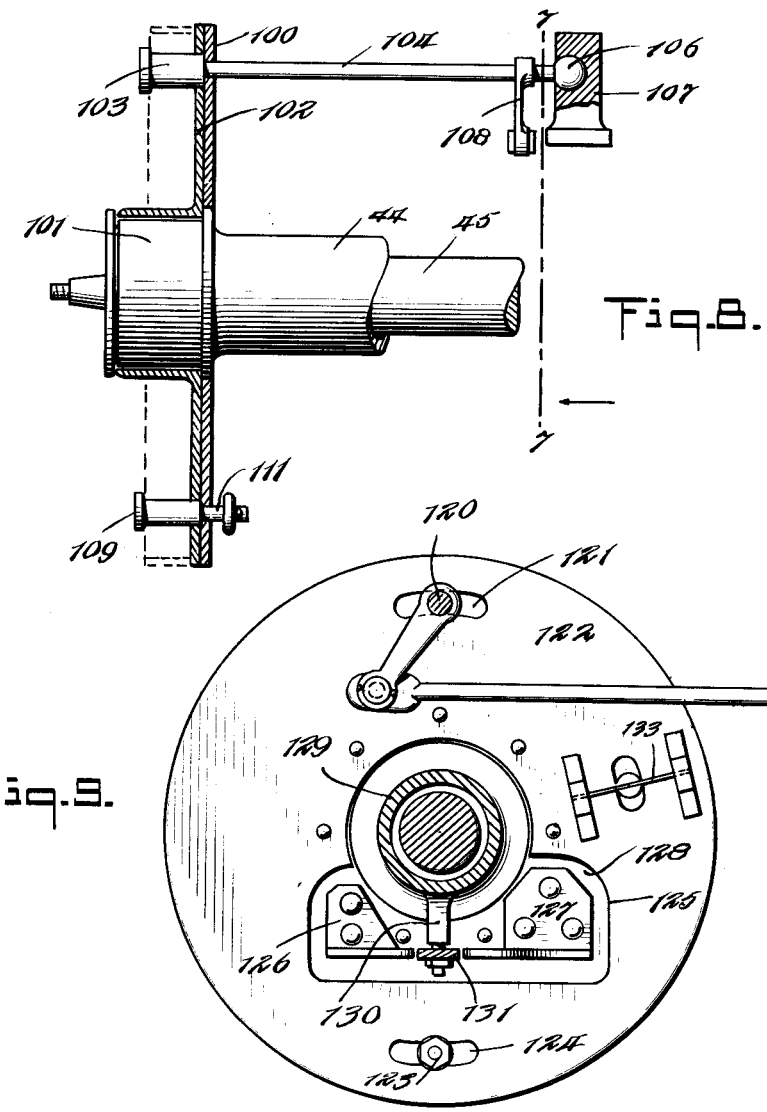
INVENTOR
*Arturo Fortini*
BY
ATTORNEYS Jan. 16, 1934. A. FORTINI 1,944,144
VEHICLE BRAKING SYSTEM
Original Filed Nov. 8, 1923 5 Sheets-Sheet 5

INVENTOR
*Arturo Fortini*
BY
ATTORNEYS

Patented Jan. 16, 1934

1,944,144

UNITED STATES PATENT OFFICE 1,944,144

VEHICLE BRAKING SYSTEM

Arturo Fortini, Florence, Italy; Lodovico Fortini, administrator of the estate of the said Arturo Fortini, deceased, assignor, by direct and mesne assignments, to Bendix Brake Company, South Bend, Ind., a corporation of Illinois Application November 8, 1923, Serial No. 673,597, and in Italy April 24, 1922. Renewed December 15, 1932

54 Claims. (Cl. 188—140)

The present invention relates to vehicle brakes and is more particularly directed to a braking system for motor vehicles which may utilize the front and rear wheels during the braking operation in an improved and highly efficient manner.

In order that an automobile may be stopped in the shortest length of time in the shortest distance and with minimum strain, tire wear and brake lining wear, it is desirable to apply braking effort through all four of the road or traction wheels. In this way, one can apply much greater braking effort and consequently obtain quicker stopping without locking the brakes or slipping or skidding the tires on the road or pavement than is possible when rear wheel brakes only are used. I have found, however, that great care must be used in the design of a four wheel braking system in order to insure safe and proper operation, and the present invention relates to an improved four wheel braking system and methods of braking motor vehicles which possess these characteristics to a maximum degree.

Four wheel braking systems heretofore available have not been entirely satisfactory on account of the possibility of improperly applying braking effort to the front wheels. These systems do not satisfactorily insure against the possibility of applying the front wheel brakes prematurely or excessively. Braking effort applied through the front wheels equal to or in excess of the rear wheel braking effort may result in skidding or more serious accident. Premature application of braking effort to the front wheels is very dangerous, especially if applied while the motor is supplying power to the rear wheels. Braking in front of the center of gravity and the supplying of power to the rear, tends to upset the vehicle.

The present invention contemplates a four-wheel braking system in which any material braking of the front wheels takes place subsequently to the braking of the rear wheels, so that the effect of the rear wheel brakes always preponderates. The braking system is so arranged that the braking of the front wheels is preferably proportionate to the braking of the rear wheels up to a certain predetermined maximum effort on the front wheels. The invention also contemplates a braking system using all four wheels in which the braking on one of the front wheels is controlled in the above manner in response to the braking on the opposite rear wheel.

A copending application Serial No. 619,002 was filed February 14, 1923, and the present application is filed as a continuation thereof as to every matter common to both applications.

In the accompanying drawings, there are shown for purposes of illustrating the invention several of the many forms in which the same may be embodied.

In these drawings,—

Fig. 1 is a diagrammatic view illustrating one mode of applying the improved four wheel brake system to a motor vehicle, such as an automobile;

Fig. 3 is a cross section taken on the line 3—3 of Fig. 2;

Fig. 4 is a vertical sectional view through one form of a left rear wheel brake mechanism taken on the line 4—4 of Fig. 5 looking toward the front of the vehicle;

Fig. 5 is a view, partly in section, taken in the direction of the arrow 5 of Fig. 4;

Figure 11:
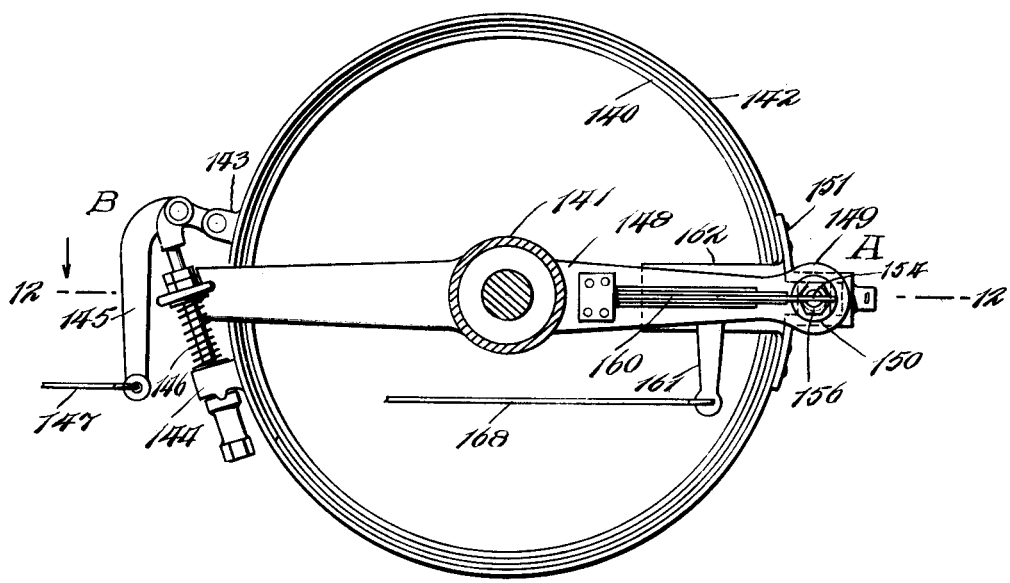
Figure 12:
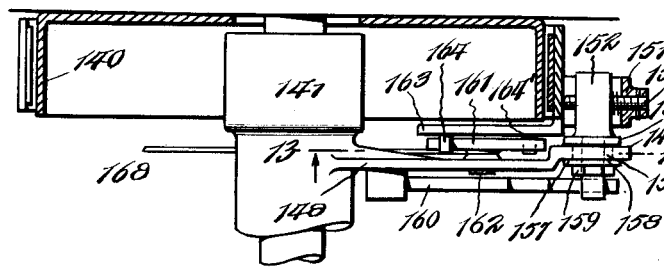
Figure 13:
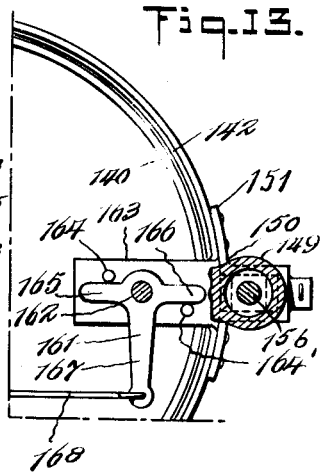
Figure 14:
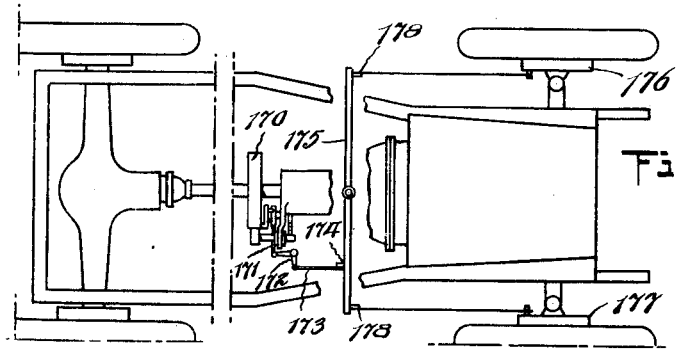

Figs. 7 and 8 are elevations and sectional views respectively showing a modified form of brake operating mechanism for the rear wheel, Fig. 7 being taken along the line 7—7 of Fig. 8 in the direction of the arrow, and Fig. 8 being taken along the line 8—8 of Fig. 7;

Fig. 9 is a side elevation of another modified form of brake operating mechanism;

Fig. 10 is a top elevation of the structure shown in Fig. 9;

Fig. 11 is a side elevation through one form of an external contracting band brake mechanism;

Fig. 12 is a horizontal sectional view taken on the line 12—12 of Fig. 11;

Fig. 13 is a section taken on the line 13—13 of Fig. 12 looking in the direction of the arrows; and Fig. 14 is a diagrammatic view illustrating the application of the braking system where a transmission brake is used.

Fig. 1 is a diagrammatic view of the chassis and running gear of an automobile. The rear or driving wheels are shown at 20 and 21 and the front or dirigible wheels are shown at 22 and 23. The rear wheels are connected through the usual differential 24 with the power plant (not shown), while the front wheels are mounted in the usual manner on the front axle 25 and are provided with the steering devices (not shown). As here shown, each of the four wheels is provided with a brake drum and cooperative brakes by which braking effort can be applied to retard the vehicle. These braking devices may be of any convenient type, either contracting or expanding brakes, or the rear brakes may be of one type while the front brakes are of the other type. It is, of course, immaterial so far as the broad aspects of the invention are concerned whether the brake drum is directly attached to the rear wheel, or whether it is connected to it through the differential and propeller shaft, as is common with transmission brakes. Such an arrangement is illustrated in Fig. 14.

In the illustration, a foot pedal 26 is mounted in any convenient manner and is connected to a cross member 27. This cross member is provided with arms or levers 28 and 29 which are connected to brake rods 30 and 31. These brake rods extend back adjacent the differential housing and are connected to levers 32 and 33 carried on transverse shafts 34 and 35. The inner ends of these shafts are supported in blocks 36 and 37 mounted on the differential housing, while the outer ends are adjacent the brakes 38 and 39 attached to the rear wheels 20 and 21. The arrangement just described for connecting the foot pedal with the rear brakes is only one of the many arrangements which could be used. A simple arrangement has been illustrated and no attempt has been made to show the equalizers, adjustments, retractile springs, and balance weights which, of course, should be used on a vehicle.

Figure 6:
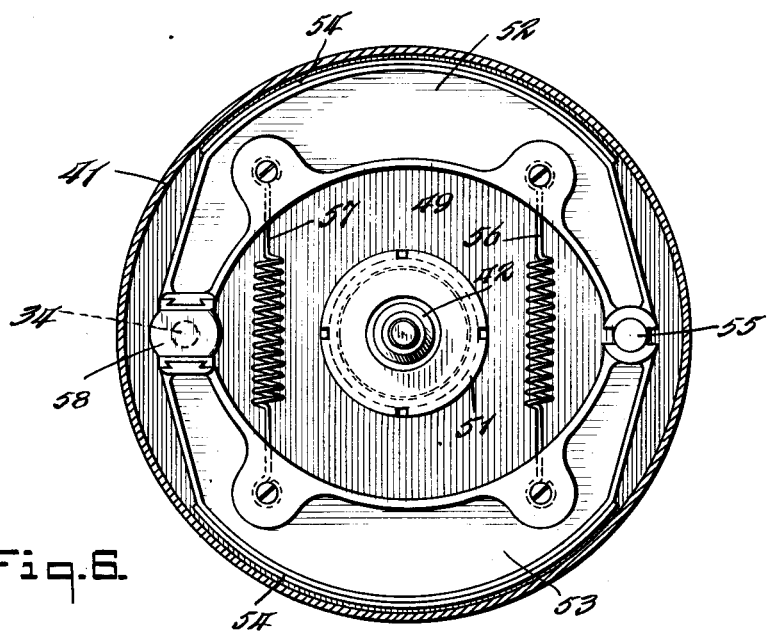
Fig. 6 is a view taken in the direction of the arrow 6 of Fig. 4, parts being omitted.

I will now describe in detail one of the many forms of rear wheel braking devices which may be used. It is illustrated in Figs. 4, 5 and 6. The rear wheel is indicated in Figure 5 by the spokes 40. The hub of the wheel may be attached to the rear axle in any suitable manner as, for example, on a cone 42 supported in suitable bearings (not shown) inside the stationary hub 43. The adjacent portions of the rear end housing is indicated at 44, and the drive shaft for the rear wheel at 45. A disk or plate 46, having a diameter slightly less than the diameter of the inner braking surface 41 of the brake drum, is fastened to a flange 47 on the housing 44 by rivets or bolts 48. This plate 46 forms a stationary, fixed mounting or support for certain parts of the brake control apparatus, and acts as a closure to keep dirt from entering inside the brake drum.

A second disk or plate 49 is disposed inside the disk 46 and is here shown as being provided with a tubular central portion 50 adapted to rotatably fit the hub 43 so that the plate 49 can move angularly about the wheel axis. It is held in place by means of a threaded nut 51 fastened to the hub, and may rub against the plate 46 with a slight amount of friction. The type of brake here illustrated is a solid block internal expansion brake, but the invention contemplates the use of other types of internal brakes as well as external brakes such as shown in Figs. 11-13. As here shown, blocks or shoes 52 and 53, provided with friction linings 54, are mounted on the plate 49 and carried inside the brake drum 38. These blocks or shoes are mounted on a pivot pin 55 and are provided with springs 56 and 57 to hold them against a wedge or oval member 58 whose configuration is such that in one position the brake blocks are held off the brake drum, as shown in Fig. 6, but which, when turned angularly, is capable of forcing these members into frictional engagement with the brake drum so as to provide braking effort and retard the vehicle. The member 58 is carried on the end of the shaft 34 and, hence, it will appear that the operator may move this member by means of the brake pedal. Details of mounting adjustment, etc. of the brake blocks have been omitted from the drawings for the sake of clearness.

As above mentioned, the disk 49 is mounted so as to be able to move in an angular direction about the axis of the brake drum. When the operator has expanded the brake blocks to frictionally engage the brake drum, the movement of the drum brought about by the rolling of the wheel, will move the brake blocks angularly in accordance with the direction of the motion of the vehicle. The device which I will now describe is so designed as to permit a limited angular movement of this brake mechanism and to utilize the angular movement of the rear wheel brake mechanism for actuating the front wheel brake mechanism.

The plate 46 is provided with suitably disposed elongated slots to permit the utilization of the angular movement of the interior brake mechanism. According to the present embodiment, the shaft 34 is transverse of the brake mechanism as well as the chassis. It extends through a slot 59 in the plate 46 to the member 58. A slot 60 disposed on the opposite side of the plate 46 provides access to a nut 61 which fastens the pin 55 in place on the disk 49. The disk 49 is provided with pins or projections 62 and 63 which extend through slots 64 and 65 in the plate 46. These last mentioned pins are disposed in a position to engage the arms 66 and 67 of a three-armed lever 68, pivoted on a stud 69 fastened to the fixed plate 46.

It will be noted that when the drum and brake blocks are in frictional engagement and the vehicle wheel is moving in a clockwise or forward direction, the pin 62 engages the arm 66 so as to move the lever 68 in a clockwise direction. It will also be noted that the pin 63 engages the arm 67 to move the lever 68 in the same direction when the wheel is going back-ward. Hence, irrespective of the direction in which the vehicle is moving at the time the rear wheel brakes are applied, the mechanism operates to move the three-armed lever 68 in a clockwise direction, moving the lower end 70 to the left, as shown in Fig. 5. This movement is communicated to a rod 71 pivotally mounted at the lower end of the lever 68. The angular movement of the brake blocks or shoes and movement of the parts is resisted by a leaf spring 72 which engages a pin 73 carried on the plate 49, a slot 74 being provided for the pin 73. The spring 72 may be single or multiple ply, equally flexible in either direction, and the ends are mounted in abutments 75 and 76 carried on the plate 46. This spring not only acts to resist the angular movement of the rear wheel braking devices but also acts to restore them to neutral angular position when the operator has released the rear wheel brake blocks from the brake drum. It also acts as a pull-off spring for the front wheel brakes, to be described.

It will, of course, be understood that whereas this phase of the invention has been specifically described in connection with a particular type of brake that it is equally applicable to conventional types.

The rod 71 (see Fig. 1) extends forward from the rear left brake to about the middle of the chassis, where it is fastened to a lever 78 carried on a shaft 79 supported in brackets 80 and 81 inside the channels 82 and 83 of the chassis frame. The other end of the shaft 79 carries a lever 84 in the form of a laminated spring, and the lower end 85 of this spring is connected with a rod 86 which extends to the brake mechanism 87 carried by the right front wheel 23.

The brake mechanism carried by the rear wheel 21 may be of any suitable type, but, for symmetry, should be similar to that carried by the rear wheel 20. It is properly arranged to operate a rod 88 which is fastened to the lower end of a lever 89 carried by shaft 90 mounted on the shaft 79. The other end of the shaft 90 carries a laminated spring lever 91, similar to the lever 85, and this is in turn connected with a rod 92 to operate a left front brake 93.

The operation of the structure so far described is as follows: Upon the application of pressure to the foot pedal by the driver, the rear wheel brakes will be expanded to bring the brake blocks into engagement with the drum. If the vehicle is moving, a slight angular movement will be imparted to the brake blocks, and this movement will be communicated either through the pins 62 or the pins 63 to the levers 68 on both sides of the rear of the car. These levers will pull the rods 71 and 88, and, through the mechanism just described, will pull on the rods 86 and 92, respectively, whereby the front wheel brakes 87 and 93 are applied. The movement of the front wheel brake operating mechanism will be directly proportional to the retarding effect given the rear wheels up to the limit of movement of the rear wheel brake devices as may be determined by the slots in the plate 46. The amount of brake pressure applied to the front wheel brakes will be limited to a predetermined amount by the laminated springs 85 and 91 interposed between the rear wheel brakes and the front wheel brakes. These laminated springs will also compensate for wear in parts.

In a typical installation, it has been found that a circumferential movement of the rear wheel brakes of about one-fourth of an inch (six millimeters) is ample for operating the front wheel brakes. Such a movement of the brakes may cause a five-eighths inch (fifteen millimeters) movement of the rod 71 by appropriately selecting the dimensions of the lever 68, and, if the springs 85 and 91 are made twice as long as the rocker arms 78 and 89, there will be available an inch and a quarter (30 millimeters) movement of the rods to operate the front wheel brakes. This movement has been found to be sufficient for satisfactory operation even though the linings of the front wheel brakes are considerably worn. After the initial tightening of the front wheel brake, the amount of braking effort is under the control of the laminated springs and it is unnecessary to make frequent adjustment of the connections to the brake. This results from the flexing of the laminated springs.

With this arrangement, it will be obvious that it is impossible to apply brake effort to the front wheels until after braking effort has been applied to the rear wheels, and that at all times and under all conditions the amount of braking effort applied to the front wheels would be some predetermined fraction of the braking effort applied to the rear wheels. As it will be impossible to check the front wheels before checking the rear wheels, it is obvious that there will be a minimum tendency of the car to skid. It will also be noted that the above described system provides for an arrangement by which braking effort may be applied to both sides of the vehicle, even though the device for operating one of the rear wheel brakes has become inefficient through wear, or has become disabled. In this way, there is at all times a balancing of the braking effort on the two sides of the car, insuring braking without affecting the direction of vehicle movement.

The structure illustrated in Figs. 7 and 8 is in general like the structure illustrated in Figs. 4, 5 and 6, except that it is designed to actuate the front wheel brakes when the vehicle is moving forward without actuating them when the vehicle is moving in a backward direction. A plate 100 is mounted on the hub 101 in a manner similar to the mounting of plate 46, and a plate 102 is mounted on the hub so as to move angularly in the same manner as plate 49. The brake blocks (or brake band where one is used) are carried from the latter mentioned plate in a manner similar to the blocks 52 and 53 of Fig. 6. One of the blocks is illustrated in dotted lines in Fig. 8. A wedge or oval member 103 is mounted on a shaft 104 which passes through a slot 105 of plate 100. The other end 106 of the shaft 104 has a ball and socket support 107 mounted on the differential housing or in some fixed part of the chassis frame, and the shaft is provided with a rocker-arm 108 in order that it may be actuated from the foot pedal 26 by a rod 108'. The brake blocks are pivoted on a pin 109 similar to the pin 55, and the plate 100 is provided with a slot 110 for the outer end 111 of the pin 109. The outer end of the pin is connected to a rod 112 which extends toward the front end of the vehicle to operate through suitable mechanism (not shown) the front wheel brakes in the same manner that they are operated by the rod 71 heretofore described. The plate 100 is also provided with a conveniently located slot 113 for a pin 114 carried on the inner plate 102, and a spring 115 is fastened to this pin and to suitable anchorages 116 and 117.

The operation of the structure of Figs. 7 and 8 is as follows: When the operator applies pressure to the foot pedal to actuate the rear wheel brakes, the member 103 is rocked on its axis, and the brake jaws expanded against the drum. This results in angular movement of the plate 102 and devices carried thereby, swinging the shaft 104 and the pin 111 in the slots 105 and 110 and exerting a pull on the rod 112 by which the front wheel brakes are actuated. The spring 114 resists this movement and operates to restore the parts to normal angular position when brake pressure is relieved. The slots and spring are so arranged that the spring holds the pins against the ends of the respective slots when the brake is idle. Should the rear wheel brakes be applied when the vehicle is going backward, there will be no tendency to actuate the front wheel brakes, as the pins are all against the ends of the slots and cannot move counterclockwise.

The structure shown in Figs. 9 and 10 is designed to actuate the front wheel brakes irrespective of the direction of motion of the vehicle. The shaft 120 which corresponds to the shaft 34 of Fig. 5 is connected to the brake pedal and to the cam as above described, and the brake may be actuated in the same manner. This shaft passes through a slot 121 in the plate 122 while the pivot pin 123 of the brake shoes passes through a slot 124. The plate 122 has a comparatively large aperture 125 through which project two lugs or ears 126 and 127 fastened to the inner plate 128. The rear axle frame 129 is provided with a lug 130 to which is pivoted a lever 131. This lever is so disposed that it is in the path of movement of the projections or ears 126 and 127.

When the operator applies brake pressure, the inner plate 128 and brake blocks and parts carried thereby will be moved in the same manner as above described. In this movement, the lug 126 or the lug 127, depending upon the direction of motion, will move the lever 131 on its pivot and exert a pull on the rod 132 which extends forward to actuate the front wheel brakes. A spring 133 corresponding with the spring 72 is provided to restore the parts to neutral angular position as above described.

Figs. 11 to 13 inclusive show an embodiment of the present invention as applied to an external, contracting band brake. This embodiment is illustrated in connection with a right hand rear wheel, though, with slight modifications it may be applied to the transmission.

A brake drum is shown at 140 and the rear axle housing is indicated at 141, it being understood that the wheel, the drive, bearings, internal brake, etc., are omitted for the sake of clearness. A brake band 142 is adapted to cooperate with the outside of the brake drum and this brake band may be any of the conventional types of brake bands. It is here shown as being provided with an anchorage or support A (which will be described in detail below) and with toggle mechanism B for contracting and expanding it. This toggle mechanism may include abutments 143 and 144 fastened to the ends of the band 142, suitably connected with a bell crank lever 145 to close the band against the drum. The rod connecting the lug 144 to the bell crank lever 145 is slidable within a sleeve carried by the horizontal arm 148. The movement of the rod 147 thus operates to draw the lugs 143 and 144 together to tighten the band about the drum. Spring 146 is provided for releasing the band from the drum. The bell crank lever 145 is connected with a rod 147 which leads through suitable mechanism to the brake pedal. Of course, any other suitable mechanism for contracting the band may be used.

The housing 141 is provided with an arm 148 which is spaced away from the brake drum a sufficient distance to accommodate mechanism to be described. The arm 148 is provided with an enlarged offset end 149 having an aperture 150 which may conveniently be made circular. The brake band 142 is attached to the usual anchor 151 in which is mounted a stud or shaft 152 adjustable by means of a screw 153. A portion of the stud or shaft is preferably made square so that it can be moved in or out along the anchor 151 by means of this bolt.

In an ordinary brake the outer end of the corresponding stud is fastened directly to a fixed support to provide a fixed anchorage for the brake band in order to prevent its being moved about the drum axis on application of the brake. In the present case, however, a floating anchorage is provided to permit the band to have a limited angular movement when applied to the drum. One of the many possible structures to permit the band to have this limited angular movement is illustrated and will now be described. The stud 152 is provided with an enlargement 155 somewhat larger in diameter than the aperture 150. The stud has a small diameter portion 156 which is disposed inside the aperture 150, and a shoulder properly spaced so that a washer 157 slightly larger than the aperture 150 may be held adjacent the outer surface 158 of the end 149 of the arm by means of a nut 159. By the arrangement above described it will be obvious that the stud 152 may be moved toward or away from the drum axis or may be moved circumferentially without being permitted to twist laterally. The stud 152 is biased to a central position by means of a spring 160 which engages a slot 154 in the end of the stud. This spring may conveniently be made of a plurality of laminations symmetrically arranged about a central lamination, the whole being anchored to the arm 148.

A three-armed lever 161 is mounted on a stud 162 fixed to the arm 148 and is carried intermediate this arm and an arm or projection 163 carried from the brake band anchorage. This arm 163 which will be moved angularly when the brake band moves about the drum axis, is provided with pins 164 and 164', which are disposed alongside the corresponding arms 165 and 166 of the three-armed lever 161. The longer arm 167 of this lever is connected to a rod 168 which extends toward the front of the vehicle to actuate the front wheel brakes in the same manner as they are actuated by the rod 88 as illustrated in Fig. 1.

When the operator applies pressure to the brake pedal in the usual manner it is communicated through the rod 147 to contract the brake band to bring it into engagement with the drum. This results in angularly moving the brake band about the drum axis in a manner determined by vehicle movement, the movement of the band being resisted by the laminated spring 160. On account of the length of the rod 147 the toggle mechanism B may be moved angularly without affecting the amount of braking effort applied. It will, of course, be understood that the particular type of toggle shown is for purposes of illustration only, and that other appropriate mechanism may be used. The movement of the brake band brought about by the movement of the vehicle, will be communicated through the appropriate pin 164 or 164' to the three-armed lever 161, then through the link 168 to the front wheel brake mechanism. When the rear brake is released spring 160 will restore the brake band to neutral angular position and will pull off the front wheel brake mechanism.

The brake mechanism which has been illustrated in detail in Figs. 11, 12 and 13 may be used with suitable floating anchorage and floating toggle mechanism as a transmission brake, in which case the rear wheels and brake drum will be interconnected in the customary manner. Such an installation is diagrammatically illustrated in Fig. 14. The floating band brake mechanism is indicated at 170. A rod 171 is connected to the three-armed lever and through suitable mechanism to operate the front brakes. A bell crank 172 and rod 173 transmit the movement to a rocker arm 174 attached to a cross rod 150

Figure 2:
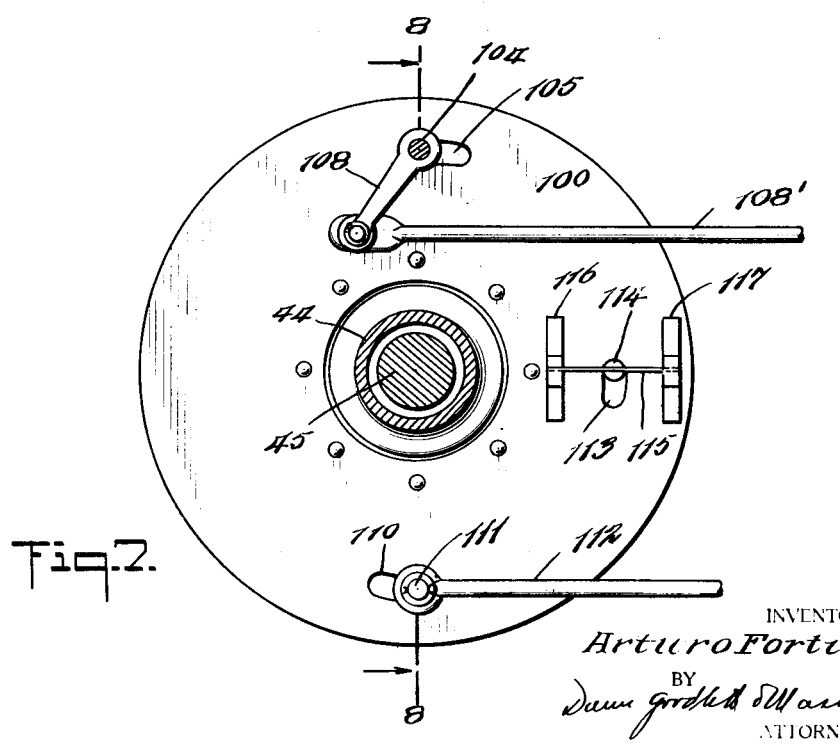
Fig. 2 is a detail view, partly in section, showing one arrangement of parts of the linkage for connecting individual rear wheel brakes with individual front wheel brakes.

175, the ends of which are connected to the front wheel brakes 176 and 177 in a suitable fashion. This connection may, if desired, include laminated springs 178 similar to springs 85 and 91 illustrated in detail in Fig. 2. When the transmission brake is applied a movement of the band will, through the mechanism above described, apply the front wheel brakes in an obvious manner.

It will of course, be understood, that the band-type brakes discussed and illustrated in Figs. 11 through 14 inclusive, may be so arranged that they actuate the front wheel brakes when the vehicle is going forward, but not when it is going backward. The single action connection may readily be provided by disposing the slot, spring and other connections in a manner which will be obvious from consideration of Figs. 11 to 13 inclusive along with Fig. 7.

In any of the brake mechanisms above described it is of course obvious that if the brakes are applied to the rear wheels or the transmission while the vehicle is at rest, they will operate as if there were no front wheel brakes and will hold the vehicle without functioning the front wheel brakes. The vehicle therefore, has substantially more braking surface in action when the vehicle is in motion than it has when at rest.

The application of braking effort to the individual rear wheels makes it possible to cross the brake connections leading to the front wheels as illustrated in Fig. 1. Such crossing of the brake connections is not possible with the transmission type brake as illustrated in Fig. 14, but it is of course obvious that one can omit the crossing over feature where the individual brakes are used on the rear wheels, if desired, actuating the front wheel brakes from one or the other of the rear wheel brakes.

It is obvious that the invention may be embodied in many forms and constructions, and I wish it to be understood that the particular forms shown and described are but a few of the many forms. Various modifications and changes being possible, I do not limit myself in any way with respect thereto.

What I claim is:

1. In a motor vehicle, in combination, independent road wheels associated with brake drums, braking devices for each of said wheels, mountings for the brake devices which permit limited angular movement of the devices on one of said wheels during application to the brake drum associated therewith, and means operative by the angular movement of the braking device for actuating the braking device on another wheel.

2. In a motor vehicle, in combination, road wheels associated with brake drums, braking devices for each of the wheels, mountings for the braking devices which permit limited angular movement of the device on one of the wheels during application to the brake drum thereof, means operative by the angular movement of the braking device for actuating the brake devices on the other wheels, and means to restore the braking device to normal position upon their release from the brake drum.

3. In a motor vehicle, in combination, a rear wheel associated with a brake drum, braking devices for the rear wheel, mountings for the braking devices which permit limited angular movement of the devices during application to the brake drum, a front wheel, braking devices for the front wheel, and interconnections between the two braking devices for operating the front wheel braking devices in response to said angular movement of the braking devices on the rear wheel while the vehicle is moving forward.

4. In a motor vehicle, in combination, a rear wheel associated with a brake drum, braking devices for the rear wheel, mountings for the braking devices which permit limited angular movement of the devices during application to the brake drum, a front wheel, braking devices for the front wheel, and interconnections between the two braking devices for operating the front wheel braking devices in response to said angular movement of the braking devices on the rear wheel while the vehicle is moving backward.

5. In a motor vehicle, in combination, a rear wheel associated with a brake drum, braking devices for the rear wheel, mountings for the braking devices which permit limited angular movement of the devices during application to the brake drum, a front wheel, braking devices for the front wheel, and interconnections between the two braking devices for operating the front wheel braking devices in response to said angular movement of the braking devices on the rear wheel while the vehicle is moving in either direction.

6. In a motor vehicle, in combination, a rear wheel associated with a brake drum, braking devices for the rear wheel, mountings for the braking devices which permit limited angular movement of the devices during application to the brake drum, a front wheel, braking devices for the front wheel, interconnections between the two braking devices for operating the front wheel braking devices in response to said angular movement of the braking devices on the rear wheel while the vehicle is moving forward, and means to restore the braking devices to normal angular position upon their release from the brake drum.

7. In a motor vehicle, in combination, a rear wheel associated with a brake drum, braking devices for the rear wheel, mountings for the braking devices which permit limited angular movement of the devices during application to the brake drum, a front wheel, braking devices for the front wheel, interconnections between the two braking devices for operating the front wheel braking devices in response to said angular movement of the braking devices on the rear wheel while the vehicle is moving backward, and means to restore the braking devices to normal angular position upon their release from the brake drum.

8. In a motor vehicle, in combination, a wheel associated with a brake drum, braking devices for the rear wheel, mountings for the braking devices which permit limited angular movement of the devices during application to the brake drum, a front wheel, braking devices for the front wheel, interconnections between the two braking devices for operating the front wheel braking devices in response to said angular movement of the braking device on the rear wheel while the vehicle is moving in either direction, and means to restore the braking devices to normal angular position upon their release from the brake drum.

9. In a motor vehicle, in combination, a traction wheel, a brake drum associated with the wheel, a braking device, means to move the braking device into frictional engagement with the brake drum, spring means to disengage the braking device from the drum, mountings for the braking device to permit the braking device to have imparted to it a limited angular movement upon engagement with the brake drum, and a spring opposing such movement.

10. In a motor vehicle, in combination, a traction wheel, a brake drum associated with the wheel, a braking device, means to move the braking device into frictional engagement with the brake drum, spring means to disengage the braking device from the drum, mountings for the braking device to permit the braking device to have imparted to it a limited angular movement upon engagement with the brake drum, and a spring opposing such movement, said spring acting to restore the braking device to normal angular position upon release from the brake drum.

11. In a motor vehicle, in combination, a traction wheel, a brake drum associated with the wheel, a braking device, means to move the braking device into frictional engagement with the brake drum, spring means to disengage the braking device from the drum, mountings for the braking device to permit the braking device to have imparted to it a limited angular movement upon engagement with the brake drum, and independent spring means opposing such movement.

12. In a motor vehicle, in combination, a traction wheel, a brake drum associated with the wheel, a braking device, means to move the braking device into frictional engagement with the brake drum, spring means to disengage the braking device from the drum, mountings for the braking device to permit the braking device to have imparted to it a limited angular movement upon engagement with the brake drum, and independent spring means opposing such movement, said spring means acting to restore the braking device to normal angular position upon release from the brake drum.

13. In a motor vehicle, in combination, a rear wheel, a brake drum associated with the wheel, a braking device, means to move the braking device into frictional engagement with the brake drum, spring means to disengage the braking device from the drum, mountings for the braking device to permit the braking device to have imparted to it a limited angular movement upon engagement with the brake drum, a front wheel, braking devices for the front wheel, and interconnections between the two braking devices for operating the front wheel braking devices in response to said angular movement while the vehicle is moving forward.

14. In a motor vehicle, in combination, a rear wheel, a brake drum associated with the wheel, a braking device, means to move the braking device into frictional engagement with the brake drum, spring means to disengage the braking device from the drum, mountings for the braking device to permit the braking device to have imparted to it a limited angular movement upon engagement with the brake drum, a front wheel, braking devices for the front wheel, and interconnections between the two braking devices for operating the front wheel braking devices in response to said angular movement while the vehicle is moving backward.

15. In a motor vehicle, in combination, a rear wheel, a brake drum associated with the wheel, a braking device, means to move the braking device into frictional engagement with the brake drum, spring means to disengage the braking device from the drum, mountings for the braking device to permit the braking device to have imparted to it a limited angular movement upon engagement with the brake drum, a front wheel, braking devices for the front wheel, and interconnections between the two braking devices for operating the front wheel braking devices in response to said angular movement while the vehicle is moving in either direction.

16. A motor vehicle having a pair of front wheels, a pair of rear wheels, braking instrumentalities for each wheel of each pair, a single operating means for the braking instrumentalities of the pair for the rear wheels, and means for operating the braking instrumentalities for one of the front wheels in response to the application of braking effort through one of the rear wheels.

17. A motor vehicle having a pair of front wheels, a pair of rear wheels, braking instrumentalities for each wheel of each pair, a single operating means for the braking instrumentalities of the pair for the rear wheels, and means for operating the braking instrumentalities for the front wheel on one side of the vehicle in response to the application of braking effort through the rear wheel on the opposite side of the vehicle.

18. A motor vehicle having a pair of front wheels, a pair of rear wheels, braking instrumentalities for each pair of wheels, operating means for the braking instrumentality for one pair of wheels, and operating means for the other braking instrumentality responsive to the application of braking effort by the first braking instrumentality, said last mentioned means including means to limit the front wheel braking effort to a predetermined proportion of the rear wheel braking effort.

19. A motor vehicle having a pair of front wheels, a pair of rear wheels, braking instrumentalities for each wheel of each pair, a single operating means for the braking instrumentalities of the pair of rear wheels, and means for operating the braking instrumentalities for one of the front wheels in response to the application of braking effort through one of the rear wheels, said last mentioned means including means to limit the front wheel braking effort to a predetermined proportion of the rear wheel braking effort.

20. A motor vehicle having a pair of front wheels, a pair of rear wheels, braking instrumentalities for each wheel of each pair, a single operating means for the braking instrumentalities of the pair for the rear wheels, and means for operating the braking instrumentalities for the front wheel on one side of the vehicle in response to the application of braking effort through the rear wheel on the opposite side of the vehicle, said last mentioned means including means to limit the front wheel braking effort to a predetermined proportion of the rear wheel braking effort.

21. A motor vehicle having a pair of front wheels, a pair of rear wheels, braking instrumentalities for each pair of wheels, operating means for the braking instrumentality for one pair of wheels, and operating means for the other braking instrumentality responsive to the application of braking effort by the first braking instrumentality, said last mentioned means including means to limit the front wheel braking effort to a predetermined proportion of the rear wheel braking effort up to a predetermined maximum braking effort for the front wheels.

22. A motor vehicle having a pair of front wheels, a pair of rear wheels, braking instrumentalities for each wheel of each pair, a single operating means for the braking instrumentalities of the pair for the rear wheels, and means for operating the braking instrumentalities for one of the front wheels in response to the application of braking effort through one of the rear wheels, said last mentioned means including means to limit the front wheel braking effort to a predetermined proportion of the rear wheel braking effort up to a predetermined maximum braking effort for the front wheels.

23. A motor vehicle having a pair of front wheels, a pair of rear wheels, braking instrumentalities for each wheel of each pair, a single operating means for the braking instrumentalities of the pair for the rear wheels, and means for operating the braking instrumentalities for the front wheel on one side of the vehicle in response to the application of braking effort through the rear wheels on the opposite side of the vehicle, said last mentioned means including means to limit the front wheel braking effort to a predetermined proportion of the rear wheel braking effort up to a predetermined maximum braking effort for the front wheels.

24. A motor vehicle having a pair of rear wheels, brake applying devices for the rear wheels, a pair of front wheels, brake applying devices for the front wheels, parts associated with the rear wheel brake applying devices, said parts being operable to apply said brake applying devices for the front wheels, the brake applying devices for said aforementioned parts serving to limit the front wheel braking effort to a predetermined proportion of the rear wheel braking effort.

25. A motor vehicle having rear wheel brakes and front wheel brakes, operating means for the front wheel brakes, said means including an instrumentality responsive to a predetermined turning movement of the rear wheel brake during the application thereof, and a yielding member for limiting the application of the front wheel brakes.

26. A motor vehicle having individual brakes for each of the front wheels, individual brakes for each of the rear wheels and operating means for each of the front wheel brakes, said means including an instrumentality responsive to a predetermined turning movement of the opposite rear wheel brake during the application thereof.

27. A motor vehicle having individual brakes for each of the front wheels, individual brakes for each of the rear wheels and operating means for each of the front wheel brakes, said means including an instrumentality responsive to a predetermined turning movement of the opposite rear wheel brake in either direction during the application thereof.

28. A motor vehicle having individual brakes for each of the front wheels, individual brakes for each of the rear wheels and operating means for each of the front wheel brakes, said means including an instrumentality responsive to a predetermined turning movement of the opposite rear wheel brake during the application thereof, and a yielding member for limiting the application of the front wheel brakes.

29. In a motor vehicle, the combination with a rear wheel of a brake drum associated therewith, a cooperative braking device, a transverse shaft, means to rock the shaft on its axis, a device carried by one end of the shaft and associated with the braking device to move it into engagement with the brake drum upon rocking the shaft, a support for the braking device, guides for the support to permit the support and device to have limited angular movement, and a ball and socket mounting for the opposite end of the shaft.

30. In a motor vehicle, the combination with a rear wheel of a brake drum associated therewith, cooperative braking devices, mountings for the braking devices to permit a limited angular movement about the drum axis upon the application of braking effort, spring means to oppose such movement, a member mounted on a fixed pivot, and interconnections between said member and braking device mountings to move the member in the same direction irrespective of the direction of movement of the braking devices.

31. In a motor vehicle, the combination with a rear wheel of a brake drum associated therewith, cooperative braking devices, mountings for the braking devices to permit a limited angular movement about the drum axis upon the application of braking effort, spring means to oppose such movement, a member mounted on a fixed pivot, interconnections between said member and braking device mountings to move the member in the same direction irrespective of the direction of movement of the braking devices, a front wheel, braking devices therefor, and interconnections between said member and the front wheel braking devices to apply braking effort to the front wheel.

32. In a motor vehicle, in combination, a rear wheel having a brake drum, cooperative braking devices, mountings for the braking devices to permit a limited angular movement about the wheel axis upon the application of braking effort, spring means to oppose such movement, a member mounted on a fixed pivot, interconnections between said member and braking device mountings to move the member in the same direction irrespective of the direction of movement of the braking devices, a front wheel on the opposite side of the vehicle, braking devices therefor, and interconnections between said member and the front wheel braking devices to apply braking effort to the front wheel.

33. In a motor vehicle, the combination with a rear wheel of a brake drum associated therewith, cooperative braking devices, mountings for the braking devices to permit a limited angular movement about the drum axis upon the application of braking effort, spring means to oppose such movement, a member mounted on a fixed pivot, interconnections between said member and the braking device mountings to move the member in the same direction irrespective of the direction of movement of the braking devices, a front wheel, braking devices therefor, and interconnections between said member and the front wheel braking devices to apply braking effort to the front wheel, said last mentioned interconnections including a yielding device to limit the braking effort applied to the front wheel.

34. In a motor vehicle, the combination with a rear wheel of a brake drum associated therewith, cooperative braking devices, mountings for the braking devices to permit a limited angular movement about the drum axis upon the application of braking effort, spring means to oppose such movement, a member mounted on a fixed pivot, interconnections between said member, and the braking device mountings to move the member in the same direction irrespective of the direction of movement of the braking devices, a front wheel, braking devices therefor, and interconnections between said member and the front wheel braking devices to apply braking effort to the front wheel, said member and said last mentioned interconnections being so proportioned that less braking effort is applied through a front wheel than is applied through a rear wheel.

35. In a motor vehicle; in combination; a rear wheel; a brake drum associated therewith; cooperative braking devices; means to actuate the braking devices into and out of engagement with the brake drum; a fixed support; means to support the braking devices from the support, said means including means to permit the braking devices to have a limited angular movement about the drum axis upon application of braking effort, and means to bias the braking devices to a predetermined angular position; a lever having a fixed pivot and two spaced apart projections carried by the braking devices, each projection being engageable with the lever to move the lever in a predetermined direction depending on the direction of movement of the braking devices.

36. In a motor vehicle; in combination; a rear wheel; a brake drum associated therewith; cooperative braking devices; means to actuate the braking devices into and out of engagement with the brake drum; a fixed support; means to support the braking devices from the support, said means including means to permit the braking devices to have a limited angular movement about the drum axis upon application of braking effort, and means to bias the braking devices to a predetermined angular position; a three-armed lever having a fixed pivot; and two spaced apart projections carried by the braking devices, one projection being engageable with an arm of the lever to move the lever in a predetermined direction irrespective of the direction of movement of the braking devices.

37. In a motor vehicle; in combination; a rear wheel; a brake drum associated therewith; cooperative braking devices; means to actuate the braking devices into and out of engagement with the brake drum; a fixed support; means to support the braking devices therefrom, said means including means to permit the braking devices to have a limited angular movement about the drum axis upon application of braking effort; and means to bias the braking devices to a predetermined angular position, a lever pivoted on the support; and two spaced apart projections carried by the braking devices, one projection being engageable with the lever to move the lever in a predetermined direction irrespective of the direction of movement of the braking devices.

38. In a motor vehicle; in combination; a rear wheel having a brake drum; cooperative braking devices; means to actuate the braking devices into and out of engagement with the brake drum; a fixed supporting plate having apertures; means to support the braking devices from the supporting plate, said means including means to permit the braking devices to have a limited angular movement about the wheel axis upon application of braking effort, and means to bias the braking devices to a predetermined angular position; a lever pivoted on the plate on the side opposite the braking devices; and two spaced apart projections carried by the braking devices and passing through said apertures, each projection being engageable with the lever to move the lever in a predetermined direction depending upon the direction of movement of the braking devices.

39. In a motor vehicle; in combination; a rear wheel having a brake drum; cooperative braking devices; means to actuate the braking devices into and out of engagement with the brake drum, a fixed supporting plate having apertures; means to support the braking devices from the supporting plate, said means including means to permit the braking devices to have a limited angular movement about the wheel axis upon application of braking effort, and means to bias the braking devices to a predetermined angular position; a three-armed lever pivoted on the plate on the side opposite the braking devices; and two spaced apart projections carried by the braking devices and passing through said apertures, each projection being engageable with an arm of the lever to move the lever in a predetermined direction depending upon the direction of movement of the braking devices.

40. In a motor vehicle; in combination; a rear wheel having a brake drum; cooperative braking devices, means to actuate the braking devices into and out of engagement with the brake drum; a fixed supporting plate having apertures; means to support the braking devices from the supporting plate, said means including means to permit the braking devices to have a limited angular movement about the wheel axis upon application of braking effort, and means to bias the braking devices to a predetermined angular position; a lever pivoted on the plate on the side opposite the braking devices; and two spaced apart projections carried by the braking devices and passing through said apertures, each projection being engageable with the lever to move the lever in a predetermined direction depending upon the direction of movement of the braking devices, the actuating means passing through an aperture in the supporting plate.

41. In a motor vehicle; in combination; a rear wheel having a brake drum; cooperative braking devices; means to actuate the braking devices into and out of engagement with the brake drum; a fixed supporting plate having apertures; means to support the braking devices from the supporting plate, said means including means to permit the braking devices to have a limited angular movement about the wheel axis upon application of braking effort, and means to bias the braking devices to a predetermined angular position; a lever having a fixed pivot; and two spaced apart projections carried by the braking devices and passing through said apertures, one projection being engageable with the lever to move the lever in a predetermined direction irrespective of the direction of movement of the braking devices, the actuating means passing through an aperture in the supporting plate.

42. A motor vehicle braking system having a set of brakes operatively connected with the rear wheels of the vehicle, a set of brakes operatively connected with the front wheels of the vehicle, a spring, interconnections with the spring to flex it upon application of the rear wheel brakes, and interconnections between the spring and the front brakes to render the front brakes ineffective when the rear brakes are released.

43. A motor vehicle having a rear wheel brake, a front wheel brake, a spring connected with the rear wheel brake to be flexed during the application thereof, and interconnections between the brakes to apply the front wheel brake in response to the application of the rear wheel brake, said spring resuming normal shape upon release of the rear wheel brake and supplying energy to release the front wheel brake.

44. A brake comprising, in combination, a wheel, a drum rotatable therewith, an angularly-movable carrier adjacent the drum, a brake band, band-operating means mounted on the carrier, and an operating device for a different brake attached to and operated by angular movement of the carrier either clockwise or counterclockwise.

45. Brake mechanism comprising, in combination, a rotatable brake drum, a fixed support, a brake band, means mounted on said support for contracting said band about said drum, and angularly movable operating means for a different brake attached to and operated by either clockwise or counterclockwise angular movement of the brake band.

46. Brake mechanism comprising, in combination, a rotatable brake drum, a fixed support, a brake band, toggle mechanism mounted on said support for contracting said band about said drum, an angularly movable floating anchor device secured to said brake band, and means operated by said floating anchor and operable to apply a different brake irrespective of the direction of movement of the anchor device.

47. Brake mechanism comprising, in combination, a rotatable brake drum, a fixed support, a brake band, means mounted on said support for contracting said band about said drum, an angularly movable floating anchor device secured to said brake band, said device comprising a stud member projecting laterally from said brake band, and means secured to said fixed support and operable by said stud for operating a remote braking mechanism.

48. Brake mechanism comprising, in combination, a rotatable brake drum, a fixed support, said support having an opening in one of its ends, a brake band, means mounted on said support for contracting said band about said drum, an angularly movable floating anchor device secured to said brake band, said device comprising a stud member projecting laterally from said band and extending through the aforementioned opening in the fixed support, and lever means secured to said fixed support and operable by said stud for operating a remote braking mechanism.

49. Brake mechanism comprising, in combination, a rotatable brake drum, a fixed support having an opening in one of its ends, a brake band, means mounted on said support for contracting said band about said drum, an angularly movable floating anchor device secured to said brake band, said device comprising a stud member projecting laterally from said band, an arm secured to said stud member, a spring secured to said fixed support at one of its ends and at its other end to said stud, and means secured to said fixed support and operable by said arm for operating a remote braking mechanism.

50. Brake mechanism for an automotive vehicle comprising a front wheel brake, a rear wheel brake, means for operating said rear wheel brake, and means interconnecting said brakes, said latter means comprising means limiting the brake applying pressure of the front wheel brake to a predetermined maximum.

51. Brake mechanism for an automotive vehicle comprising a front wheel brake, a rear wheel brake, means for operating said rear wheel brake, and means forming an uninterrupted connection between said brakes, said connection including a yieldable means of such construction as to limit the brake applying pressure of the front wheel brake to a predetermined maximum.

52. Brake mechanism for an automotive vehicle comprising brakes on each of the four wheels of the vehicle, means for operating the brakes on the rear wheels, means interconnecting the right front brake with the left rear brake, and means interconnecting the left front brake with the right rear brake whereby each of the front brakes is operated with operation of the opposite rear brake.

53. In an automotive vehicle provided with a brake, a drive shaft and a chassis, a rotor member drivably connected to said shaft, friction means contactible with said rotor member, means for forcing said friction means into contact with said rotor member, an angularly movable floating anchor device secured to said friction means, a support member secured to said chassis, a lever member pivotally mounted on said support member, means interconnecting said lever member and anchor device for operating said lever member irrespective of the direction of movement of the anchor device, and means operably connecting the lever member and brake to be operated.

54. In an automotive vehicle provided with a brake, a drive shaft and a chassis, a rotor member drivably connected to said shaft, friction means contactible with said rotor member, means for forcing said friction means into contact with said rotor member, an angularly movable floating anchor device secured to said friction means, a support member secured to said chassis, a three arm lever member pivotally mounted on said support member, and means including force transmitting members contactible with two of the arms of said lever, means interconnecting said lever member and anchor device for operating said lever member irrespective of the direction of movement of the anchor device, and means operably connecting the lever member and brake to be operated.

ARTURO FORTINI.